July 28, 1931.  C. G. FINK ET AL  1,816,476
MANUFACTURE OF DOUBLE WALLED RECEPTACLES
Filed Sept. 7, 1926
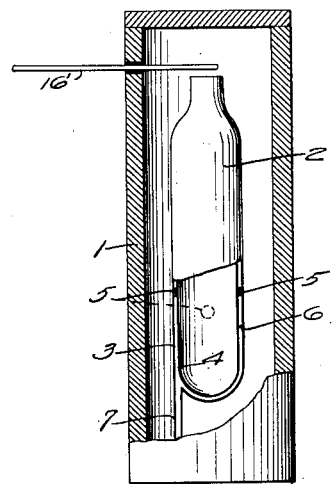
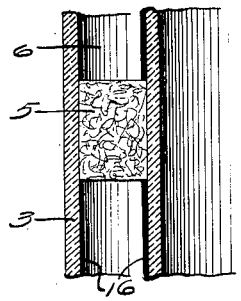
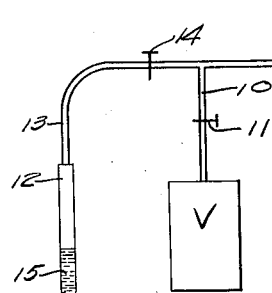
INVENTORS
COLIN G. FINK
WALTER G. KING, JR
BY
ATTORNEY Patented July 28, 1931

1,816,476

UNITED STATES PATENT OFFICE

COLIN G. FINK AND WALTER G. KING, JR., OF NEW YORK, N. Y., ASSIGNORS TO THE AMERICAN THERMOS BOTTLE COMPANY, OF NORWICH, CONNECTICUT, A CORPORATION OF OHIO

MANUFACTURE OF DOUBLE-WALLED RECEPTACLES

Application filed September 7, 1926. Serial No. 133,862.

Our invention relates generally to the manufacture of vacuum vessels of the well-known double-walled type employing two containers spaced by an annular vacuum chamber. These containers, which constitute a filler, as it is called, are usually of glass, and the inside walls of the vacuum chamber have heretofore been silvered to prevent loss of heat by radiation from the contents of the inner container. It is the object of our invention to provide novel methods and means for coating the double walls of the vacuum chamber with a mirror-like metal surface.

In the manufacture of vacuum bottles of the type referred to, the process of silvering heretofore employed is a wet process and consists in depositing a silver coating on the glass walls by precipitation from a solution of silver nitrate, pumping out the remaining solution, and thoroughly rinsing the silvered surfaces with cold water. The bottle then must be baked in an oven for several hours to give the silver a permanent set and to dry the silvered chamber as much as possible before evacuating the same. These operations require a silvering department and a drying department. Now, while the baking does set the precipitated silver, it does not remove all moisture from the chamber, owing to the constricted tubular path through which the steam must slowly escape. The presence of moisture in the space to be evacuated has always been a cause of serious troubles and difficulties in the manufacture of vacuum bottles. It has been absolutely impossible, under this wet silvering process, to get rid of all moisture in the vacuum chamber, because moisture clings tenaciously to the precipitated silver, particularly in corners and crevices where the precipitation is thick, and it also gets into the asbestos spacing pads arranged between the two containers. Asbestos being fibrous, moisture remains occluded in these pads even after the long baking operation, so that the presence of moisture in the vacuum space must always be reckoned with during these vacuum operations. This moisture interferes with securing a proper degree of vacuum and thereby greatly reduces the heat-insulating efficiency of the bottle. Moreover, moisture in the evacuated space gets into the exhaust pumps and makes frequent cleaning of the same necessary. Also, it is a common experience that the presence of moisture in the vacuum chamber frequently causes the bottles to break. In addition to these difficulties due to moisture, the use of silver is objectionable in that it tends to vitiate the vacuum, as silver has the property of absorbing large quantities of oxygen which it will slowly give off under vacuum. Then, too, the silver solutions are expensive. Obviously, all these factors in the prior "wet silvering" process considerably increase the cost of producing the glass fillers of vacuum bottles.

It is the purpose of our invention to overcome the foregoing and other difficulties and objections inherent in methods of wet-silvering vacuum bottles by means of a dry process which is quick, cheap, clean and efficient in producing the required metal coating on the inside walls of the vacuum chamber. To this end, in the preferred form of our invention, we cause vapor of nickel carbonyl to pass into the evacuated space of the filler, which is kept at a high temperature. As the vapor comes in contact with the hot surface of the glass, it is almost instantly decomposed into carbon monoxide and metallic nickel. The latter deposits on the walls of the bottle to form a bright mirror of nickel. The carbon monoxide is subsequently drawn off by the exhaust pump, and may be used over again to produce fresh quantities of nickel carbonyl. This mirror-forming operation may be repeated until a nickel coating of the required thickness is formed, whereupon the vacuum space is sealed.

In order that those skilled in this art may understand our invention fully and clearly, we shall describe a preferred form of procedure in carrying our ideas into effect, without intending the described details as limitations or restrictions of the invention. Although this process is independent of any particular apparatus, the diagrammatic illustrations in the accompanying drawings will be of help in explaining the invention and its advantages. In these drawings, which have been made as simple as possible in a diagrammatic way, Fig. 1 represents suitable apparatus for carrying out our process; and Fig. 2 is a fragmentary view on an exaggerated scale to indicate the metal mirror and also how the spacing pads between the two containers are held in place by the surrounding metal deposit.

In a suitable oven 1, which may be an electric oven or any other practical type, is supported a glass filler 2. As the construction of these fillers for vacuum bottles is well-known, we need only say that this filler comprises an outer cylinder or container 3 and an inner cylinder 4. These cylinders are integrally united at the top and held spaced by pads or buttons 5 of asbestos or other suitable heat-insulating material. The annular space 6 between the cylinders is adapted to be connected with a vacuum pump. For this purpose the outer cylinder 3 is formed with a tubular extension 7, which is here shown connected with a pipe 8 by means of a heavy-walled rubber tube 9. From the pipe 8 extends a branch pipe 10 which leads to a vacuum pump diagrammatically represented by the outline V. A valve or pinchcock 11 controls the connection of pipe 8 with the vacuum pump. A suitable container 12 is connected with pipe 8 through a tube 13, and a valve or pinch-cock 14 controls the connection of container 12 with pipe 8. The container 12 is adapted to hold a quantity of liquid nickel carbonyl, diagrammatically indicated at 15. A thermometer 16', properly inserted in the oven, enables the operator to observe the temperature to which the filler in the oven is subjected.

The operation of producing a nickel mirror on the vacuum walls of a glass filler by means of the simple apparatus above described is as follows:

Let us assume that a bottle has been placed in the oven and that the temperature inside the oven has reached about 160° C. The operator opens valve 11 to connect the annular space 6 with the vacuum pump. The exhausting operation continues until the vacuum in space 6 is of the order of one-tenth of a millimeter of mercury. Thereupon valve 11 is closed and valve 14 is opened, thus connecting the nickel carbonyl liquid in container 12 with the evacuated chamber 6. At this reduced pressure a predetermined quantity of nickel carbonyl is vaporized and passes into the annular space 6 of the filler. Here the vapor of nickel carbonyl comes in contact with the hot surface of the glass walls and is almost instantly decomposed into carbon monoxide and metallic nickel. The latter is deposited as a substantially uniform film on the surrounding glass walls to form a bright mirror. The valve or cock 14 is kept open for a certain number of seconds, depending upon the area of the surface to be coated and the thickness of coating required. This is readily determined by experiment. If it is desired to increase the thickness of the mirror surface, the operation just described is repeated until the required thickness of nickel mirror is obtained. It should be noted that the glass surface requires no special preparation of any kind before the introduction of the nickel carbonyl vapor. In Fig. 2, the deposited nickel mirror is indicated at 16, but very much exaggerated for clearness. The filler is then exhausted to the desired degree and sealed at the tubular extension 7. The sealed nickel-mirrored bottle is removed from the oven and used as desired.

These fillers are usually enclosed in metallic casings and the completed article constitutes what is known in trade as a vacuum bottle. The filler need not be sealed immediately after the nickel-coating operation, but it may be disconnected from the apparatus and exhausted and sealed at another time. It is understood that this postponement must not be indefinite, as nickel is not an absolutely stable metal.

It has been found in practice that three treatments with nickel carbonyl are usually sufficient to produce a nickel mirror of requisite thickness, but we want it understood that our invention is not limited to any specific number of treatments, which may be one or more. The temperature of the bottle in the oven during the mirror-forming process may be on either side of 160° C., the temperature above specified. We have successfully used temperatures as low as 130° C. and up to 200° C., and there is reason to believe that these limits may be extended. The exact temperature to be used is determined, among other things, by the color and quality of mirror desired.

Referring to Fig. 2, even though the nickel coating 16 is very thin, it nevertheless has appreciable thickness and serves to retain the pads 5 against displacement by ordinary shocks or jars. In other words, the pads are anchored in position by the nickel deposit. The nickel mirror does not cover the small round areas where the pads 5 press against the glass, but that does not interfere with the usefulness of the mirrored surfaces. Hence, when we refer to the deposited coating as completely covering the walls of the vacuum chamber, allowance must be made for the spacing pads and for such irregularities as may occur in the mirrored surface in spite of all precautions. In processes of this nature, it is not always possible in practice to obtain perfect results even under the best conditions.

The nickel mirror obtained by our process is of great permanency, especially after the vacuum is established. The deposited film will not peal or crack off under heat or cold. It adheres very closely to the glass, filling little depressions and irregularities in the glass surface. Furthermore, the nickel coating is not affected by sulphur fumes, which is one objection to the silver coating, and our mirror surface will not become "blind" as readily as the old silver mirror when operating the exhaust ovens at too high temperature. This is due to the fact that nickel is much more resistant to high temperatures than silver. As for the thickness of the nickel deposit, that may vary from 0.002 to 0.2 of a mil, and it may even be thicker, but that is not necessary for vacuum containers. We mention these limits merely as illustrations of practical working thicknesses and not as limitations. By the term "mil" we mean $\frac{1}{1000}$ of an inch.

Although we have specified nickel carbonyl as the compound which we prefer at this time for the deposit of a metallic mirror in the vacuum chamber, we do not thereby intend to exclude the use of other metal compounds that are volatile under conditions suitable for factory operation. As examples of such other compounds, we may mention the chlorides of aluminum, antimony, copper, titanium, bismuth and tin, and carbonyl of iron, all of which require a temperature of less than 400° centigrade for the reduction of the metal according to our process. While it would be possible and even practical to use these compounds in our process, we find that, taking all the requisites into account, nickel approaches the ideal nearer than any other metal. The particular advantages in the use of nickel carbonyl are these:—the compound is easily reduced to metal on the surface of the hot glass; the melting point of nickel is far above the temperature of the exhaust oven; nickel is non-poisonous and will not contaminate food if the glass filler should accidentally break when the bottle contains food or drink; the mirror formed by nickel approaches that of silver in appearance and has a high reflectivity for thermal radiations. Lastly, nickel takes up residual oxygen, carbonic acid and water vapor, thereby improving the vacuum of the bottle after the same is sealed.

Since our new process is carried out dry, the difficulties due to the presence of moisture in the old wet silvering process are entirely eliminated by this invention. Whereas the old process required hours for silvering each bottle (including the necessary baking), the present dry process takes only a few minutes. Another advantage is the low cost of nickel as compared with silver. Therefore, the important practical results of our invention are—first, a material reduction in the manufacturing cost of the completed filler; second, a more efficient bottle on account of the better vacuum obtainable.

It will be understood that the details of the procedure as described may be varied in practice and that many different forms of apparatus can be employed to carry this process into commercial operation. In speaking of double-walled vacuum receptacles in the description and claims, we do not confine ourselves to containers with only one vacuum chamber, but intend to include containers having walls to form more than one vacuum chamber. Manifestly, a multiple-walled vacuum receptacle has at least two walls and one vacuum chamber. Further, the underlying idea of our invention is applicable in forming a metal mirror on the inside walls of evacuated glass containers other than those previously described. When we speak of nickel carbonyl, we do not necessarily mean the pure undiluted compound, for the same may be used in diluted form, as by the addition of nitrogen or hydrogen.

We claim as our invention:

1. In the manufacture of vacuum receptacles in which an inner and outer container of glass are spaced by a vacuum chamber, the process of coating the walls of said chamber with a mirror-like metal surface, which comprises heating the glass walls of the vacuum chamber to a temperature below 400° centigrade, and then introducing a metal compound into the vacuum chamber under such conditions that the compound is broken up and the metal is deposited on the preheated surrounding glass walls to cover the same with a substantially uniform mirror-like surface.

2. In the manufacture of vacuum receptacles in which an inner and outer container of glass are spaced by a vacuum chamber, the process of coating the inner walls of said chamber with a mirror-like metal surface, which comprises heating the receptacle to a temperature below 400° centigrade, and then introducing nickel carbonyl vapor into the evacuated chamber while maintaining the containers at a sufficiently high temperature to cause metallic nickel to be deposited on the surrounding glass walls in a substantially uniform mirror-like film.

3. In the manufacture of vacuum receptacles in which an inner and outer container of glass are spaced by a vacuum chamber, the process of coating the walls of said chamber with a mirror-like metal surface, which comprises exhausting said chamber while maintaining the glass receptacle at a temperature from about 130° C. to about 200° C., introducing a quantity of nickel carbonyl vapor into the preheated evacuated chamber, whereby metallic nickel is deposited on the surrounding glass walls in a substantially uniform mirror-like film, and sealing the evacuated nickeled chamber.

4. In the manufacture of double-walled glass fillers for vacuum bottles, the improvement which consists in introducing the vapor of a metal compound into the vacuum chamber of a filler preheated to a temperature not exceeding 400° centigrade and causing the metal of said compound to be deposited on the hot walls of said chamber in a substantially uniform mirror-like surface.

5. In the manufacture of double-walled glass fillers for vacuum bottles, the improvement which consists in introducing the vapor of a nickel compound into the vacuum chamber of a filler preheated to about 130°–200° centigrade and causing metallic nickel to be deposited from said compound on the hot walls of said chamber in a substantially uniform mirror-like surface.

6. In the manufacture of multi-walled glass fillers for vacuum bottles, the improvement which consists in introducing nickel carbonyl vapor into the vacuum chamber or chambers of a filler preheated to about 130°–200° centigrade and causing metallic nickel to be deposited from said compound on the hot chamber walls in a substantially uniform mirror-like surface.

7. In the manufacture of evacuated glass containers, the improvement which consists in introducing the vapor of a nickel compound into an evacuated container preheated to about 130°–200° centigrade and causing metallic nickel to be deposited from said compound on the hot inner glass surface of said container as a substantially uniform mirror-like film or coating.

COLIN G. FINK.
WALTER G. KING, Jr.